US011026297B2

(12) United States Patent
Kim et al.

(10) Patent No.: US 11,026,297 B2
(45) Date of Patent: Jun. 1, 2021

(54) METAL NANOWIRE HEATER AND METHOD OF FABRICATING THE SAME

(71) Applicant: KOREA INSTITUTE OF SCIENCE AND TECHNOLOGY, Seoul (KR)

(72) Inventors: Sang Woo Kim, Seoul (KR); Dong Gyu Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 319 days.

(21) Appl. No.: 15/987,136

(22) Filed: May 23, 2018

(65) Prior Publication Data

US 2018/0352611 A1    Dec. 6, 2018

(30) Foreign Application Priority Data

May 30, 2017   (KR) .................... 10-2017-0067031

(51) Int. Cl.
| | |
|---|---|
| *H05B 3/86* | (2006.01) |
| *B23K 28/00* | (2006.01) |
| *H05B 3/02* | (2006.01) |
| *H05B 3/12* | (2006.01) |
| *H05B 3/36* | (2006.01) |
| *H05B 3/00* | (2006.01) |

(Continued)

(52) U.S. Cl.
CPC ............. *H05B 3/86* (2013.01); *B23K 28/006* (2013.01); *H05B 3/0014* (2013.01); *H05B 3/12* (2013.01); *H05B 3/36* (2013.01); *B82Y 30/00* (2013.01); *B82Y 40/00* (2013.01); *C01P 2004/16* (2013.01); *H05B 2203/013* (2013.01); *H05B 2203/014* (2013.01); *H05B 2214/02* (2013.01); *H05B 2214/04* (2013.01)

(58) Field of Classification Search
None
See application file for complete search history.

(56) References Cited

U.S. PATENT DOCUMENTS 8,174,667 B2 *   5/2012   Allemand ............. B82Y 10/00
                                                          349/187
10,024,840 B2 *  7/2018   Srinivas ................ A01N 59/16
(Continued)

FOREIGN PATENT DOCUMENTS

| KR | 10-2015-0084689 A | 7/2015 |
|---|---|---|
| KR | 10-1532578 B1 | 7/2015 |
| KR | 10-1637920 B1 | 7/2016 |

OTHER PUBLICATIONS

KR 101637920 B1, Jul. 2016, Park, "Transparent Film Heater," partial translation . (Year: 2016).*
Korean Office Action dated Oct. 29, 2018.

*Primary Examiner* — Joseph M. Pelham
(74) *Attorney, Agent, or Firm* — Rabin & Berdo, P.C.

(57) ABSTRACT

Provided is a metal nanowire heater and a method of fabricating the metal nanowire heater that includes providing a substrate; coating on the substrate a nanowire film containing metal nanowires that are laser-etchable; thermally joining portions of the metal nanowires to enhance connection between contact parts of the metal nanowires and provide an enhanced nanowire film by at least one unit cycle of supplying the ionic liquid onto the nanowire film and applying heat from outside to cause the ionic liquid to change its phase; and forming electrodes on the enhanced nanowire film to provide the metal nanowire heater.

14 Claims, 8 Drawing Sheets

(51) Int. Cl.
   *B82Y 40/00* (2011.01)
   *B82Y 30/00* (2011.01)

(56) References Cited

U.S. PATENT DOCUMENTS

| | | | |
|---|---|---|---|
| 2010/0243295 A1* | 9/2010 | Allemand | H05K 9/0092 |
| | | | 174/250 |
| 2011/0297642 A1* | 12/2011 | Allemand | H01B 1/22 |
| | | | 216/13 |
| 2013/0251943 A1* | 9/2013 | Pei | B29C 41/003 |
| | | | 428/141 |
| 2014/0202738 A1* | 7/2014 | Allemand | C09D 5/24 |
| | | | 174/251 |
| 2014/0299359 A1* | 10/2014 | Mittal | B05D 3/007 |
| | | | 174/251 |
| 2016/0346839 A1* | 12/2016 | Ishii | C09B 67/0097 |
| 2017/0353996 A1* | 12/2017 | Lee | H05B 3/20 |
| 2018/0277787 A1* | 9/2018 | Pei | H01L 51/0021 |

* cited by examiner

METAL NANOWIRE HEATER AND METHOD OF FABRICATING THE SAME

CROSS-REFERENCE TO RELATED PATENT APPLICATION

This application claims the benefit of Korean Patent Application No. 10-2017-0067031, filed on May 30, 2017, in the Korean Intellectual Property Office, the disclosure of which is incorporated herein in its entirety by reference.

BACKGROUND

1. Field

The present invention relates to a heater and a method of fabricating the same, and more particularly, to a metal nanowire heater or a flexible heater having high heating characteristics and a free shape and design, and a method of fabricating the same.

2. Description of the Related Art

Transparent heaters have transparency and have heating characteristics based on joule heating, and thus are variously used for car window defrosters, heating fiber, flexible transparent heaters, etc. Currently, due to development of technologies, next-generation heating elements of heaters require all of high transmittance, high heating characteristics, and high flexibility. Easy applicability to wearable devices having free forms and shapes is also required. A general indium tin oxide (ITO) heating element broadly used as a transparent heater is not easily usable as a heater for highly-flexible devices due to restrictions in flexibility based on characteristics of oxide, and requires high-priced deposition equipment due to a deposition process in a high-vacuum chamber, e.g., sputtering. On the contrary, metal nanowires have a high transmittance and flexibility and thus currently attract much attention of people as a next-generation heating element material. In addition, the metal nanowires are providable in a liquid phase and thus are easily producible in a large quantity based on a roll-to-roll process.

The heating characteristics of a heater are increased in proportion to electricity when a certain voltage is applied to the heating element. Electricity is in inverse proportion to resistance based on Ohm's law. Therefore, when the resistance of the heating element is low, electricity may be increased and heating characteristics at the same voltage may be improved. However, compared to the general ITO transparent heater, the metal nanowire heater has a higher resistance and thus has lower heating characteristics at the same voltage.

When a heater having various heating characteristics is fabricated, to make a heat wire having a free shape and design, the ITO heater material requires a photolithography process using a high-priced device, and a cleaning process using a chemical solvent.

SUMMARY

To solve the above problem of the metal nanowire heating element, e.g., low heating characteristics at the same voltage compared to the general ITO heating element, resistance of the nanowires should be reduced. As a general process for reducing resistance of a nanowire heating element, a light sintering process for inducing joining of wires by using light energy is disclosed. However, the process of sintering the nanowire heating element by using light energy is not easily applicable to substrates having free forms and shapes and requires a high equipment cost.

Another problem of the metal nanowire heating element is that oxidation easily occurs in the air due to characteristics of metal and thus resistance of the heater may be rapidly increased and heating characteristics thereof may be greatly reduced. Furthermore, since the nanowires having a very small thickness of several ten nanometers do not have good heat resistance characteristics, contact between the nanowires may be broken at a high temperature (e.g., 150° C. to 200° C.) and thus a rapid increase in resistance may be caused. Since a binder is not used when the metal nanowires are coated, adhesive strength to a substrate is weak and thus the metal nanowires are vulnerable to external impact.

A heater, especially a flexible heater, requires a patterning process capable of freely designing a form and shape of the heating element based on a purpose of use. In a general photolithography process for patterning a metal nanowire heating element, an optical mask should be produced whenever a pattern of the heating element is changed, and thus a high process cost is required.

The present invention provides a flexible heater having high heating characteristics at a low voltage by effectively reducing resistance of a metal nanowire heating element based on joining of nanowires without restrictions in substrate forms and shapes. The present invention also provides a metal nanowire heater including an overcoating layer, which has a high transmittance and durability to improve durability against external impact and heat resistance characteristics at a high temperature, having a high process speed, and capable of easily generating a complicated pattern in a large area to freely design the heating element.

However, the scope of the present invention is not limited thereto.

According to an aspect of the present invention, there is provided a method of fabricating a metal nanowire heater, the method including a coating step of coating, on a substrate, a coating film containing laser-etchable and low-melting-point metal nanowires, a thermal joining step of enhancing connection between contact parts of the metal nanowires due to a chemical and physical action occurring when an ionic liquid is phase-changed, by supplying the ionic liquid onto the coating film and applying heat from outside, and an electrode forming step of forming electrodes on the coating film.

The ionic liquid in the thermal joining step may include ionic water or an alcoholic liquid including any one selected from the group consisting of metallic salts or compounds of aluminum chloride ($AlCl_3.6H_2O$), aluminum sulfate ($Al_2(SO_4)O_3$), aluminum nitrate ($Al(NO_3)_3.9H_2O$), and ammonium chlorate ($NH_4ClO_3$), which promote joining of metal nanowires.

The metal nanowires may include at least one selected from the group consisting of copper, aluminum, gold, silver, palladium, platinum, nickel, rhodium, ruthenium, tungsten, and zinc, which are sensitive to and etchable using a laser beam and have low melting points, or the group consisting of alloys thereof.

The substrate may include a flexible film or substrate including polyethylene terephthalate (PET), polycarbonate (PC), cyclic polyolefin (COP), modified polyphenylene oxide (modified PPO), polyacrylonitrile (PAN), polyacetal (POM), triacetate cellulose (TAC), polyethersulfone (PES), liquid crystal polymer (LCP), polyphenylene sulfide (PPS), polyestersulfone (PES), polyarylate (PAR), polyetheretherketone (PEEK), polyetherimide (PEI), polyimide (PI), fabric, paper, mulberry paper, or non-woven fabric, or a hard plastic substrate or a glass substrate.

The thermal joining step may include a step of performing a unit cycle of the thermal joining step of enhancing the connection between the contact parts of the metal nanowires due to the chemical and physical action occurring when the ionic liquid is phase-changed, by supplying the ionic liquid onto the coating film and applying heat from outside, one time to four times.

A resistance value of a metal nanowire heater fabricated by performing the unit cycle may be lower than a resistance value of a metal nanowire heater fabricated without performing the unit cycle, and may be gradually reduced as the number of times that the unit cycle is performed is gradually increased from one to four.

The ionic liquid in the thermal joining step may include distilled water.

The coating step may include a brush coating, wire bar coating, slot die coating, spray coating, or spin coating step.

The method may further include a patterning step of patterning the coating film by using a short-wavelength laser.

The method may further include a step of forming, on the coating film, an overcoating layer containing polymethylmethacrylate (PMMA), polyurethane, polymethylmethacrylate (PMMA), polyacrylonitrile (PAN), polyacrylic acid (PAA), polydimethylsiloxane (PDMS), polyphenylene sulfide (PPS), polyether sulfone (PES), COP (cyclic polyolefin), modified polyphenylene oxide (modified PPO), polyphenylene sulfide (PPS), polyarylate (PAR), polyetheretherketone (PEEK), polyetherimide (PEI), polyimide (PI), an organic-inorganic hybrid silicon coating material, silicone, or a liquid silica coating material.

According to another aspect of the present invention, there is provided a metal nanowire heater including a coating film fabricated using the above-described method.

The metal nanowire heater may have a resistance value less than 40Ω while ensuring a transmittance equal to or higher than 90% in a wavelength band of 550 nm. In particular, the metal nanowire heater may have a resistance value of about 15Ω at a transmittance of 90.6% in the wavelength band of 550 nm.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
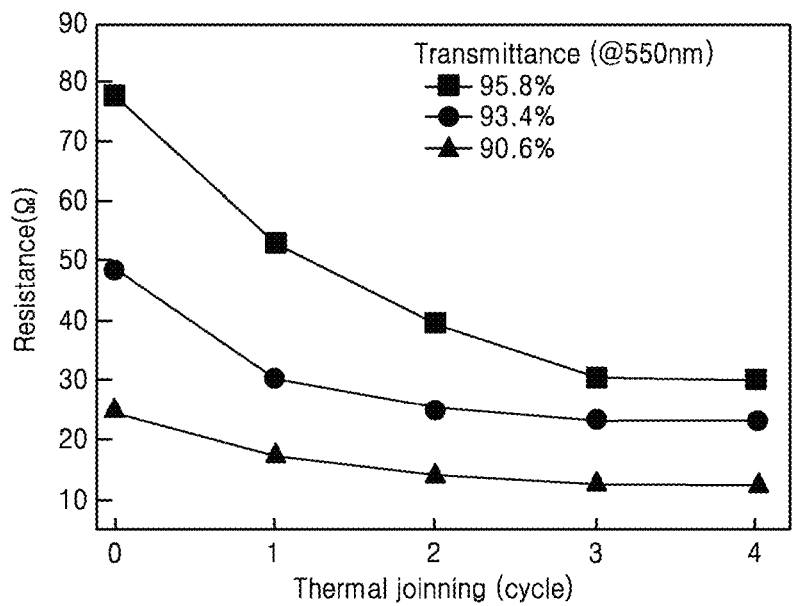
FIG. 1 is a graph showing reduction in resistance based on nanowire joining cycles and transmittance.

To solve the above problems, in the present invention, by coating a metal nanowire heater on a substrate without restrictions in substrate shapes and types and then supplying an ionic liquid and applying heat from outside, joining of nanowires is induced due to a chemical and physical action occurring during the phase transformation of the ionic liquid. According to the present invention, by supplying an ionic liquid to a flexible heater, which includes a metal nanowire heating element, and applying heat from outside, thermal joining of metal nanowires, e.g., enhancing connection between contact parts of the metal nanowires, may be induced due to a chemical and physical action occurring during the phase transformation of the ionic liquid. As such, a flexible heater having high heating characteristics at a low voltage may be fabricated by effectively reducing resistance of the nanowire heating element. The above-described thermal joining process does not have restrictions in substrate shapes and types, is environment-friendly, requires a very low process cost, is usable as a roll-to-roll process, and thus has a very high possibility of commercialization. In addition, energy may be saved because higher heating characteristics may be achieved at the same voltage, and higher flexibility may be achieved because networking characteristics of the heating element may be enhanced due to thermal joining of the nanowires.

A process usable to coat the substrate may not be restrictive and, for example, brush coating, wire bar coating, slot die coating, spray coating, spin coating, or dip coating may be used.

The substrate may use various types of substrates such as polyethylene terephthalate (PET), polycarbonate (PC), cyclic polyolefin (COP), modified polyphenylene oxide (modified PPO), polyacrylonitrile (PAN), polyacetal (POM), triacetate cellulose (TAC), polyethersulfone (PES), liquid crystal polymer (LCP), polyphenylene sulfide (PPS), polyestersulfone (PES), polyarylate (PAR), polyetheretherketone (PEEK), polyetherimide (PEI), and polyimide (PI) films or sheets, fabric, paper, mulberry paper, non-woven fabric, plastic, and glass, and is not limited to any particular type.

An overcoating layer having a high heat resistance, durability, and transmittance may be generated to protect the metal nanowire heating element, and may use coating materials such as polymethylmethacrylate (PMMA), polyurethane, polymethylmethacrylate (PMMA), polyacrylonitrile (PAN), polyacrylic acid (PAA), polydimethylsiloxane (PDMS), PPS, PES, COP, modified PPO, PPS, PAR, PEEK, PEI, PI, an organic-inorganic hybrid silicon coating material, silicone, and a liquid silica coating material.

A flexible heater having a free design and a large-area pattern may be patterned to various forms and shapes based on purposes of use by locally removing the nanowires by using a short-wavelength laser to design the metal nanowire heating element.

In the present invention, a heating element having high heating characteristics at a low voltage may be fabricated by effectively reducing contact resistance between metal nanowires without restrictions in substrate shapes and types, and adhesive strength to a substrate may be increased by coating, on the heating element, a liquid silica coating material or a PDMS overcoating material having a high transmittance, durability, and heat resistance. In addition, a transparent heater having stable heating characteristics at a high temperature and having a high heat resistance without reducing transmittance of the transparent heater may be fabricated.

Table 1 shows sheet resistance variations based on a nanowire joining temperature and speed.

TABLE 1

| Joining Speed | Nanowire Joining Temperature | | | | | |
|---|---|---|---|---|---|---|
| (cm²/s) | 53° C. | 77° C. | 115° C. | 135° C. | 148° C. | 157° C. |
| 3.20 | −0.18 | −0.17 | −0.19 | −0.40 | −0.39 | −0.35 |
| 1.60 | −0.18 | −0.22 | −0.28 | −0.41 | −0.36 | −0.29 |
| 1.07 | −0.22 | −0.27 | −0.30 | −0.40 | −0.32 | −0.22 |
| 0.80 | −0.18 | −0.29 | −0.36 | −0.39 | −0.20 | −0.15 |
| 0.64 | −0.23 | −0.27 | −0.31 | −0.38 | −0.06 | −0.12 |

A silver nanowire solution obtained by diluting silver nanowires having a thickness range of 20 nm to 50 nm and a length range of 25 μm to 30 μm, in ethanol to 0.5 wt % is bar-coated on a PET film having a thickness of 100 μm. The metal nanowires may include one or more metals among copper, aluminum, gold, silver, palladium, platinum, nickel, rhodium, ruthenium, tungsten, zinc, and alloys thereof, which are laser-etchable and have low melting points, and more particularly, may be silver nanowires. The coating process may not be restrictive and, for example, brush coating, wire bar coating, slot die coating, spray coating, or spin coating may be used. Thereafter, to fabricate a heater, electrodes are generated at two ends of the coated film by using silver paste. An ionic liquid is evenly sprayed on a coating film uniformly coated with the silver nanowires and having a transmittance equal to or higher than 90%, and then joining of the nanowires is induced by applying heat from outside. The ionic liquid may include one or more metallic salts or compounds among aluminum chloride ($AlCl_3 \cdot 6H_2O$), aluminum sulfate ($Al_2(SO_4)_3$), aluminum nitrate ($Al(NO_3)_3 \cdot 9H_2O$), and ammonium chlorate ($NH_4ClO_3$), which promote joining of metal nanowires due to a chemical action, and more particularly, aluminum sulfate. Referring to Table 1, the sheet resistance variations of the metal nanowire heater are measured based on the nanowire joining temperature and speed.

The nanowire joining temperature, in this specification, refers to a temperature at which nanowires join due to a chemical and physical action occurring when a sprayed ionic liquid is phase-changed by external heat, and the joining of the nanowires based on variations in the joining temperature may be shown using the sheet resistance variations.

Likewise, the nanowire joining speed, in this specification, refers to a time for applying heat from outside to a unit area of the metal nanowire heating element, and refers to a speed at which the nanowires join due to a chemical and physical action occurring when an ionic liquid sprayed on the heating element experiences a phase transformation.

The nanowire joining temperature may be 53° C. to 157° C., and more particularly, 100° C. to 150° C. When the temperature is out of the above range, a substrate may be deformed, the coated nanowires may be damaged, and an effect of reducing the sheet resistance may be weakened. The metal nanowire joining speed may be 0.1 cm²/s to 10 cm²/s, and more particularly, 0.64 cm²/s to 3.2 cm²/s. When the speed is out of the above range, a substrate may be deformed or an effect of reducing the sheet resistance may be weakened, and a process time may be increased.

FIG. 1 is a graph showing reduction in resistance based on nanowire joining cycles and transmittance.

A coating film uniformly coated with silver nanowires and having a visible transmittance equal to or higher than 90% is initially generated. Subsequently, distilled water is sprayed on the coating film and then a unit cycle of a thermal joining process for applying heat is performed one time to four times. The thermal joining process is performed in a condition of a joining temperature of 135° C. and a joining speed of 3.2 cm²/s. When the unit cycle is performed more or less than the above number of times, an effect of reducing the sheet resistance may be weakened or the coated metal nanowire heating element may be damaged. Thereafter, to fabricate a heater, electrodes are generated at two ends of the coated film by using silver paste. In this condition, resistance variations of a metal nanowire heater fabricated by repeating a thermal joining cycle one time to four times are measured for each transmittance.

Referring to FIG. 1, it is shown that, compared to a case when a coating film uniformly coated with silver nanowires is generated but the above-described thermal joining process is not performed, in a case when the coating film uniformly coated with the silver nanowires is initially generated and then the process of thermal joining the metal nanowires is repeatedly performed up to four times, the resistance of the metal nanowire heater is gradually reduced. It is shown that the above effect is more significant in a condition that the transmittance of the metal nanowire heater is 95.8%.

That is, it is shown that the resistance value of the metal nanowire heater fabricated by performing the unit cycle is lower than the resistance value of the metal nanowire heater fabricated without performing the unit cycle, and is gradually reduced as the number of times that the unit cycle is performed is gradually increased from one to four.

As such, the metal nanowire heater may have a resistance value less than 40Ω while ensuring a transmittance equal to or higher than 90% in a wavelength band of 550 nm. For example, the metal nanowire heater may have a resistance value of about 15Ω at a transmittance of 90.6% in the wavelength band of 550 nm.

Figure 2:
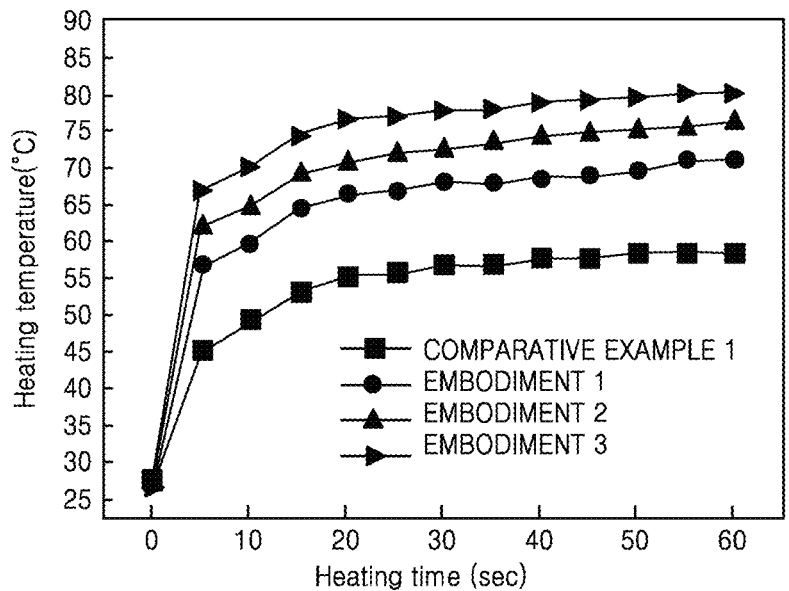
FIG. 2 is a graph showing heating characteristics based on nanowire joining cycles.

FIG. 2 is a graph showing heating characteristics based on nanowire joining cycles.

Comparative Example 1 corresponds to a case when a coating film uniformly coated with silver nanowires is generated but the above-described thermal joining process is not performed, and Embodiments 1 to 3 correspond to cases when the coating film uniformly coated with the silver nanowires is generated as in Comparative Example 1, distilled water is sprayed on the coating film, and then a unit cycle of a thermal joining process for applying heat is performed one time to three times, respectively.

Referring to FIG. 2, the metal nanowire joining cycle is repeated one time to three times and heating temperatures of heaters are measured based on time. Comparative Example 1 corresponds to a metal nanowire heater fabricated without performing the thermal joining process, and Embodiments 1 to 3 correspond to metal nanowire heaters fabricated by performing the thermal joining process different numbers of times. It is shown that an average heating temperature after 60 seconds in the metal nanowire heater of Comparative Example 1 is 58.4° C., and that average heating temperatures after 60 seconds in the metal nanowire heaters of Embodiments 1 to 3 are sequentially increased to 71° C.→76.4° C.→80.2° C. based on the thermal joining cycles.

Figure 3:
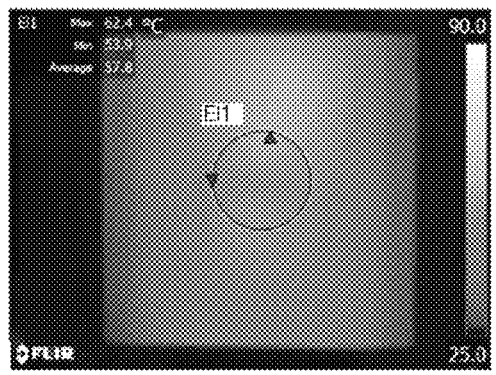
FIG. 3 illustrates infrared images for comparing heating characteristics based on a nanowire joining effect.
Figure 3:
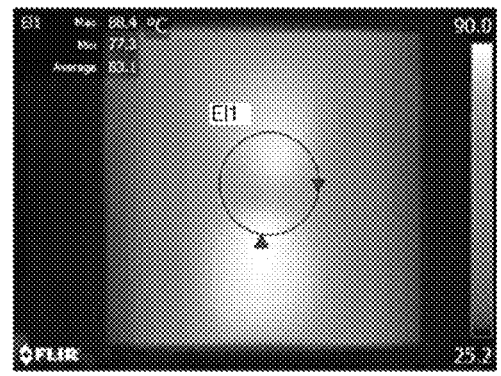

FIG. 3 illustrates infrared images for comparing heating characteristics based on a nanowire joining effect.

Referring to FIG. 3, Comparative Example 2 corresponds to a metal nanowire heater fabricated without performing the above-described thermal joining process, and Embodiment 4 corresponds to a metal nanowire heater fabricated by repeating the thermal joining process three times on the metal nanowire heater fabricated according to Comparative Example 2. The heating characteristics of the metal nanowire heaters at the same voltage are measured using the infrared images.

Since a heating temperature after 60 seconds in Comparative Example 2 is measured as 57.8° C. but a heating temperature after 60 seconds in Embodiment 4 is measured as 83.1° C., it is shown that resistance of the metal nanowires is reduced and heating characteristics thereof is greatly improved due to thermal joining.

Figure 4:
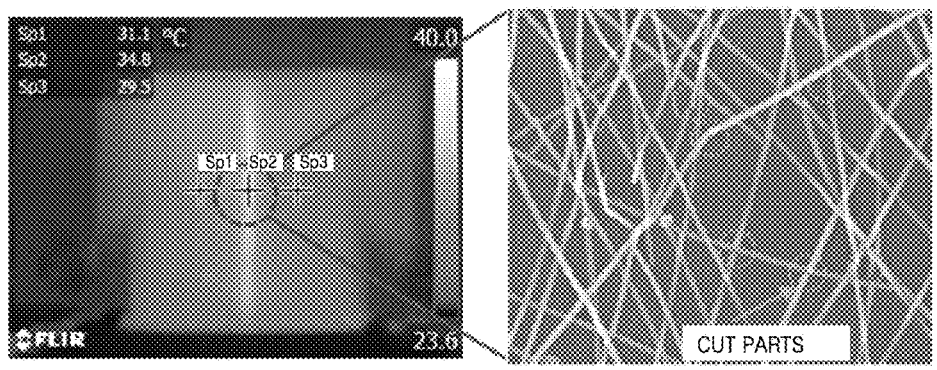
FIG. 4 illustrates infrared images and scanning electron microscope (SEM) images of nanowires based on whether the nanowires thermally join.
Figure 4:
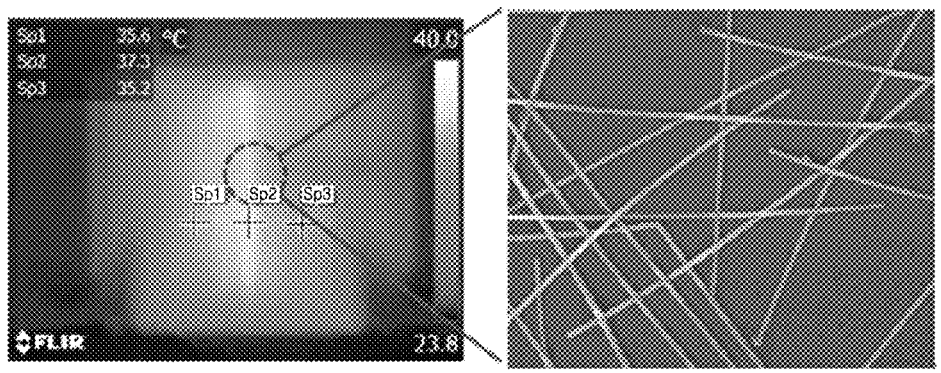

FIG. 4 illustrates infrared images and scanning electron microscope (SEM) images of nanowires based on whether the nanowires thermally join.

In FIG. 4, metal nanowire heaters according to Comparative Example 3 and Embodiment 5 are bent to the same radius of curvature and images are captured using an infrared camera to measure heating characteristics thereof. Comparative Example 3 corresponds to a metal nanowire heater fabricated without performing the above-described thermal joining process, and Embodiment 5 corresponds to a metal nanowire heater fabricated by repeating the thermal joining process three times on the metal nanowire heater fabricated according to Comparative Example 3. Referring to FIG. 4, Comparative Example 3 shows a general metal nanowire heater on which no process is performed, and an image of a part of a heating layer of the heater, which receives force when a film is bent to a radius of curvature of 1.35 mm, by using a SEM. As a result, it is shown that most nanowires are cut and that temperature of the part which receives force when the film is bent is increased. According to Embodiment 5, when a film is bent to the same radius of curvature after the metal nanowire joining cycle is repeated three times, it is shown that networking characteristics are enhanced due to a nanowire joining effect, that nanowires are not cut, and that temperature of a part of a heating layer of the heater, which receives force, is hardly changed.

Figure 5:
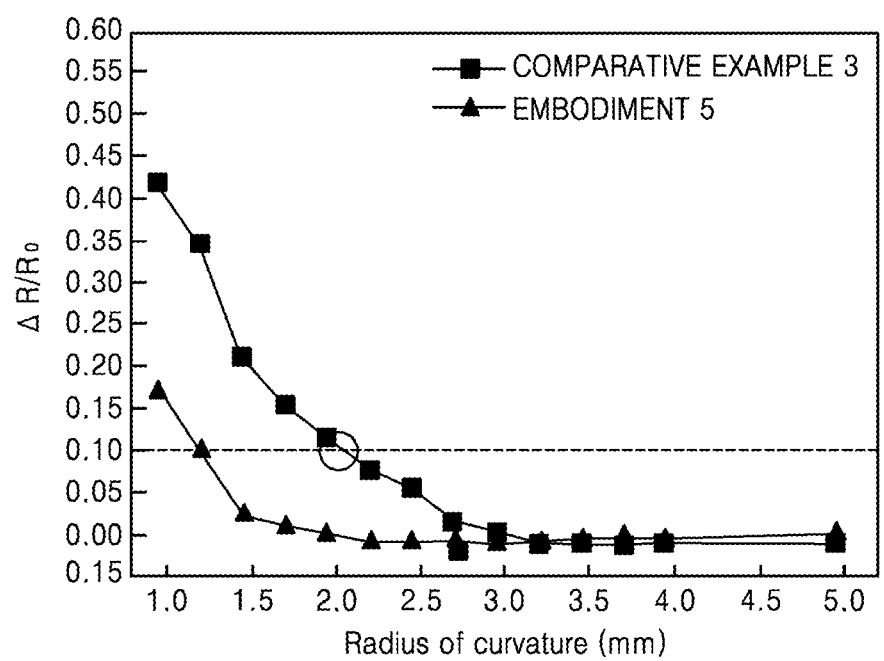
FIG. 5 is a graph showing resistance variations of metal nanowire heaters based on radii of curvature.

FIG. 5 is a graph showing resistance variations of metal nanowire heaters based on radii of curvature.

In FIG. 5, the resistances of the metal nanowire heaters according to Comparative Example 3 and Embodiment 5 are measured based on variations in the radii of curvature. Referring to FIG. 5, Comparative Example 3 indicates a general metal nanowire heater on which no process is performed, and it is shown that a maximum radius of curvature under a resistance variation of 10% is 2.1 mm. According to the metal nanowire heater of Embodiment 5, in which networking characteristics between the metal nanowires are enhanced after the metal nanowire thermal joining is repeated three times, it is shown that the maximum radius of curvature under the resistance variation of 10% is reduced to 1.21 mm.

Figure 6:
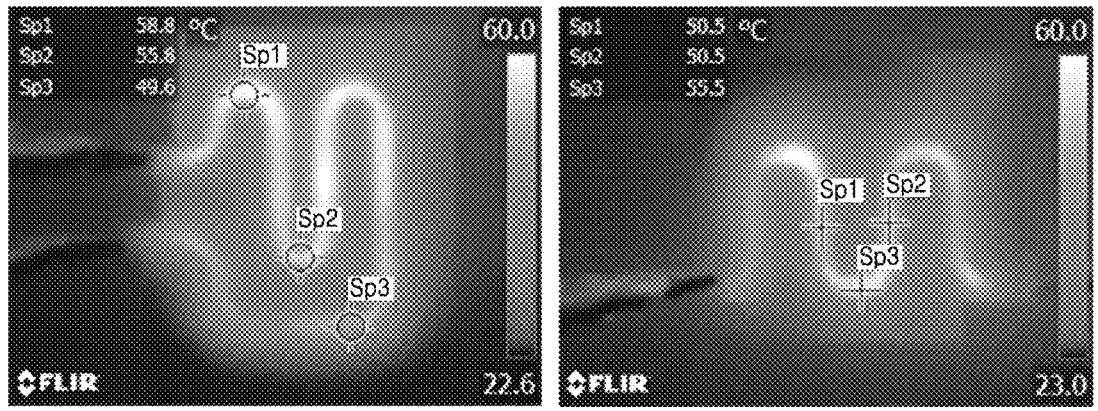
FIG. 6 illustrates infrared images of laser-patterned metal nanowire heaters.

FIG. 6 illustrates infrared images of laser-patterned metal nanowire heaters.

FIG. 6 shows the heating characteristics of metal nanowire heaters patterned using an yttrium aluminum garnet (YAG) laser. When a voltage is applied to both ends of each patterned heating element, heating occurs along a connected line. It is shown that a heater having a free design based on a purpose of use may be fabricated using the patterning.

A flexible heater requires a patterning process capable of freely designing a form and shape of the heating element based on a purpose of use. In a general photolithography process for patterning a metal nanowire heating element, an optical mask should be produced whenever a pattern of the heating element is changed, and thus a high process cost is required. On the contrary, in a fabricating method according to an embodiment of the present invention, nanowires may be locally removed by using a short-wavelength laser to design a metal nanowire heating element, and thus a flexible heater having a free design and a large-area pattern may be fabricated by patterning the heater to various forms and shapes based on purposes of use.

A desired shape and design of a heating element may be obtained based on a purpose of use by using a laser patterning process having a high process speed and capable of easily generating a complicated pattern in a large area, among various patterning processes capable of patterning a heating element. In particular, the above-described metal nanowires may easily absorb optical energy of a laser, be photoetchable at low power, and thus achieve an excellent patterning effect.

Figure 7:
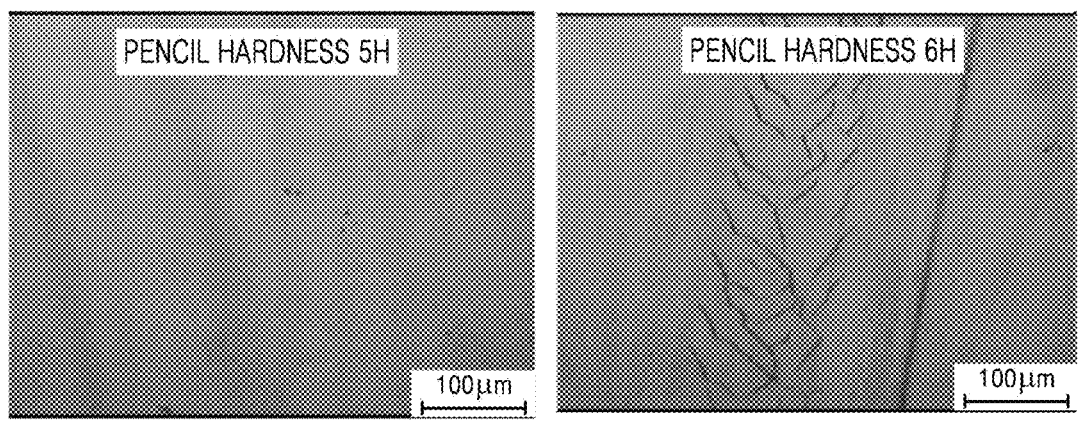
FIG. 7 illustrates images showing a result of measuring pencil hardness of a metal nanowire heater including a liquid silica coating layer.

FIG. 7 illustrates images showing a result of measuring pencil hardness of a metal nanowire heater including a liquid silica coating layer as an overcoating layer. That is, FIG. 7 shows the pencil hardness of a thermally-joined metal nanowire heater including a liquid silica coating layer. It is shown that the pencil hardness of the liquid silica coating layer is 5H, which is very high value.

Figure 8:
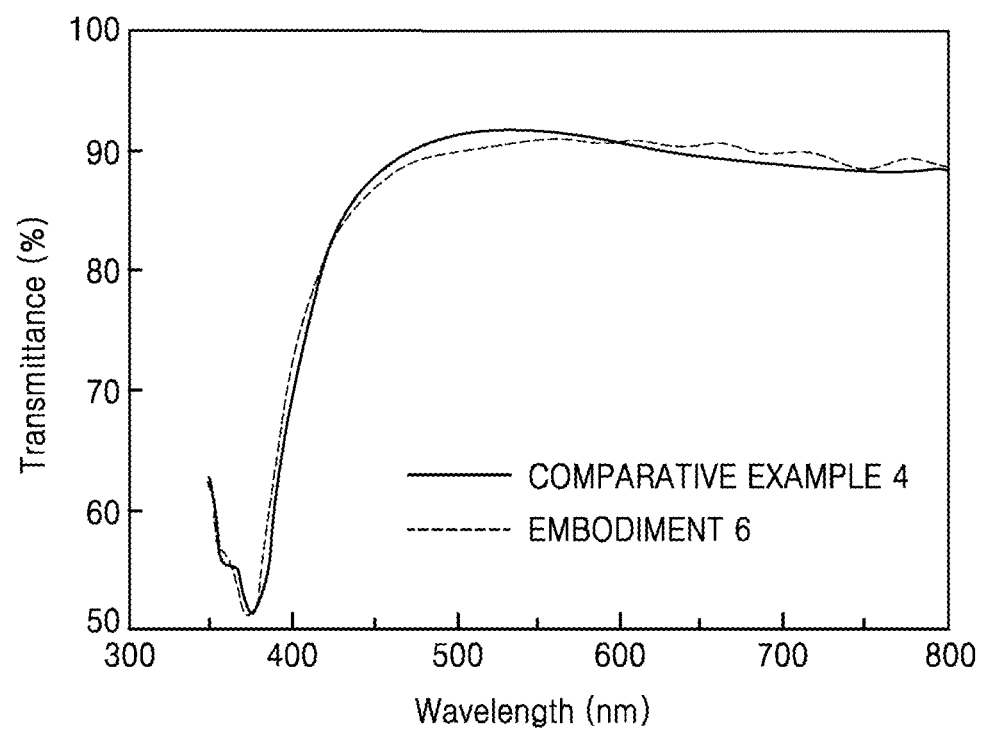
FIG. 8 is a graph showing transmittance based on whether a liquid silica coating layer is included.

FIG. 8 is a graph showing transmittance based on whether a liquid silica coating layer is included. That is, FIG. 8 comparatively shows transmittances in cases when the liquid silica coating layer is and is not provided on a thermally-joined metal nanowire heater.

Referring to FIG. 8, Comparative Example 4 shows transmittance of a thermally-joined metal nanowire heater not including an overcoating layer, when a substrate is excluded. Unlike Comparative Example 4, Embodiment 6 shows transmittance of a heater including an overcoating layer. It is shown that the transmittance in a wavelength band of 550 nm is very slightly reduced by about 0.9% (Comparative Example 4 (91.7%)→Embodiment 6 (90.8%)), and that a high transmittance equal to or higher than 90% is maintained.

Figure 9:
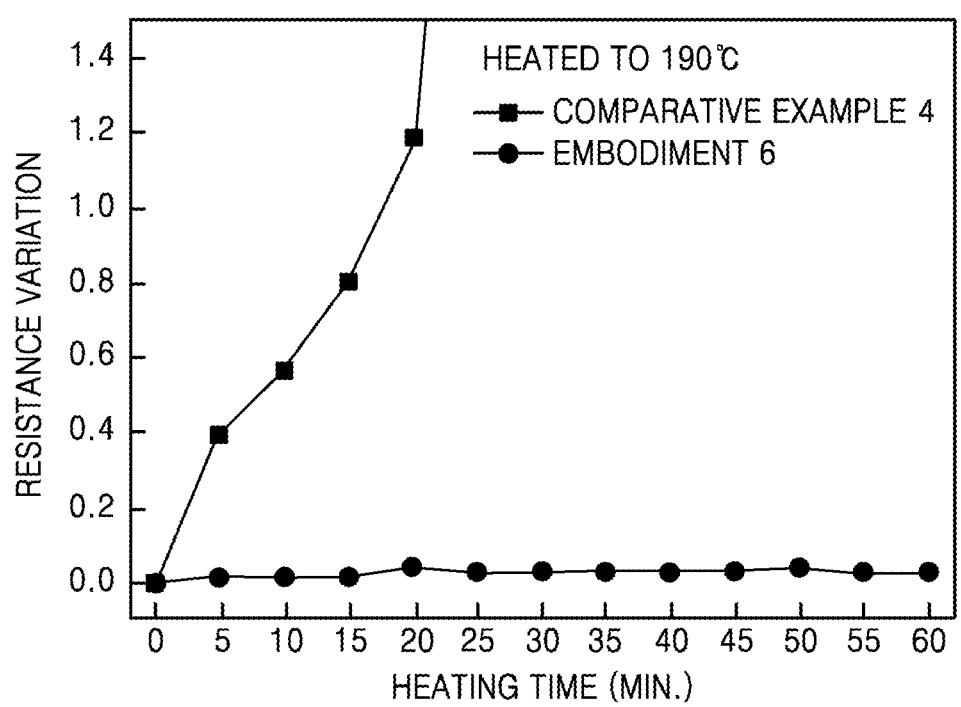
FIG. 9 is a graph showing heat resistance characteristics based on whether a liquid silica coating layer is included.

FIG. 9 is a graph showing heat resistance characteristics based on whether a liquid silica coating layer is included. That is, FIG. 9 comparatively shows resistance variations at a certain external temperature based on time in cases when liquid silica is and is not spin-coated on a thermally-joined metal nanowire heater.

By coating, on a heating element, an overcoating layer having a high transmittance, durability, and heat resistance, adhesive strength to a substrate may be greatly increased. Furthermore, very stable heating characteristics may be achieved due to the high heat resistance of the overcoating layer. In particular, a liquid silica coating material having an excellent transmittance may be used to fabricate a transparent heater having a high durability without reducing transmittance of the transparent heater.

Referring to FIG. 9, Comparative Example 4 indicates a thermally-joined metal nanowire heater not including an overcoating layer, and Embodiment 6 indicates a metal nanowire heater including a spin-coated liquid silica coating layer. FIG. 9 comparatively shows heat resistances in cases when a metal nanowire heating layer includes and does not include a liquid silica coating layer. As a result of comparing resistances of the heaters based on time at an external temperature of 190° C., compared to Comparative Example 4, it is shown that resistance variations hardly occur in Embodiment 6 in which the liquid silica coating layer is included.

Figure 10:
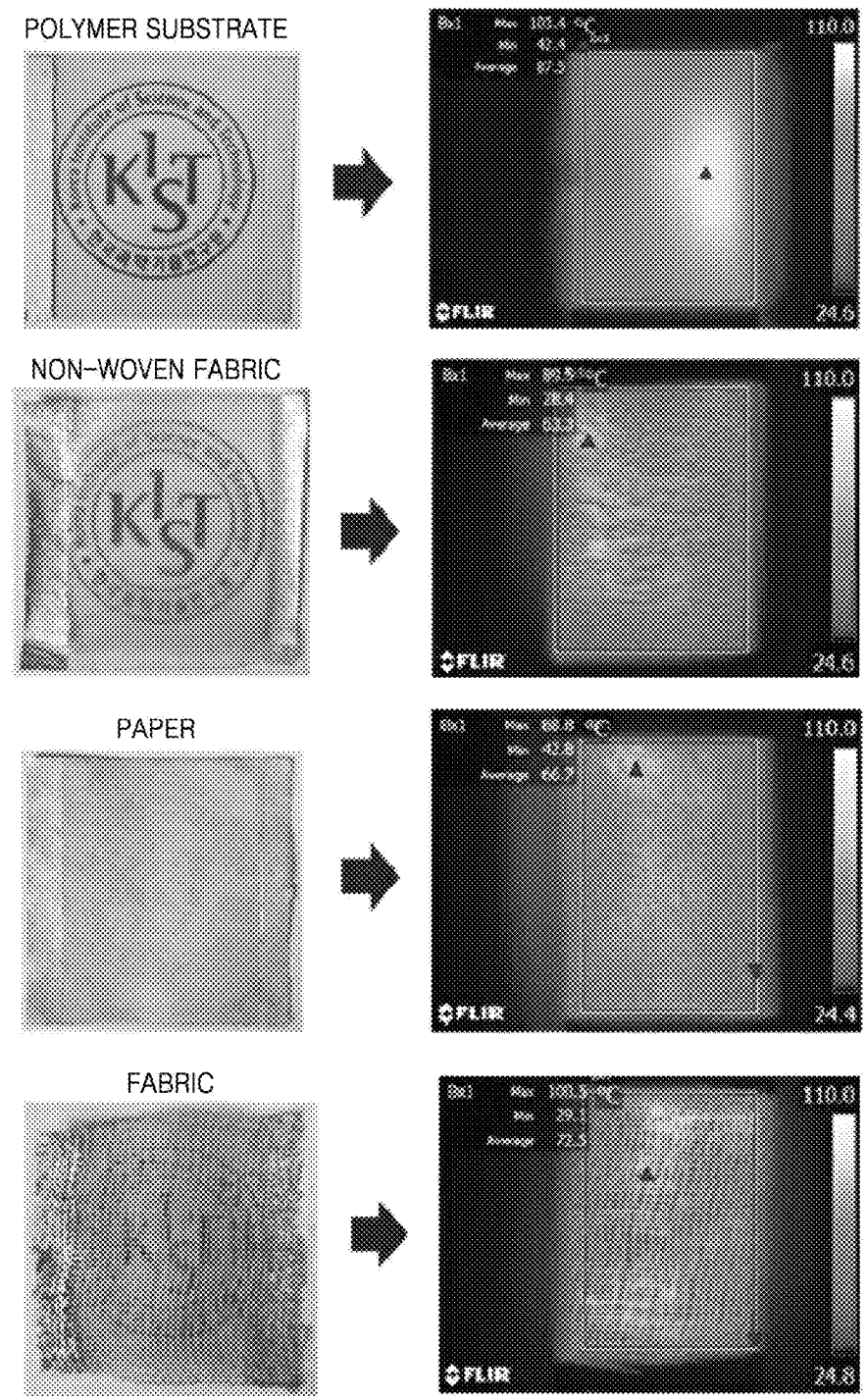
FIG. 10 illustrates images showing the heating characteristics of metal nanowire heaters on various substrates.

FIG. 10 illustrates images showing heating characteristics of metal nanowire heaters on various substrates. That is, FIG. 10 illustrates images showing heating characteristics of heaters fabricated by coating metal nanowires on various substrates having different forms and shapes. A polymer substrate, paper, non-woven fabric, and fabric are prepared to a size of 4 cm×4 cm, and are dipped in and coated with a solution obtained by diluting silver nanowires in ethanol to 0.5 wt %. Thereafter, heaters are fabricated by drying the substrates in an oven at 80° C. for one hour and then generating silver paste electrodes at two ends of each substrate. As a result of measuring heating characteristics thereof by capturing infrared images, it is shown that the heaters are at 80° C. to 100° C. after 60 seconds from when a voltage is applied, and thus have very high heating characteristics.

As a process for reducing resistance of a nanowire heating element, a light sintering process for inducing joining of wires by using light energy may be considered. However, the process of sintering the nanowire heating element by using light energy is not easily applicable to substrates having free forms and shapes and requires a high equipment cost.

According to an embodiment of the present invention, since metal nanowires may be coated on various substrates such as a flexible film, fabric, paper, mulberry paper, and non-woven fabric without restrictions in substrate shapes and types, wearable devices may be very easily produced and future possibility of commercialization may be very high.

Figure 11:
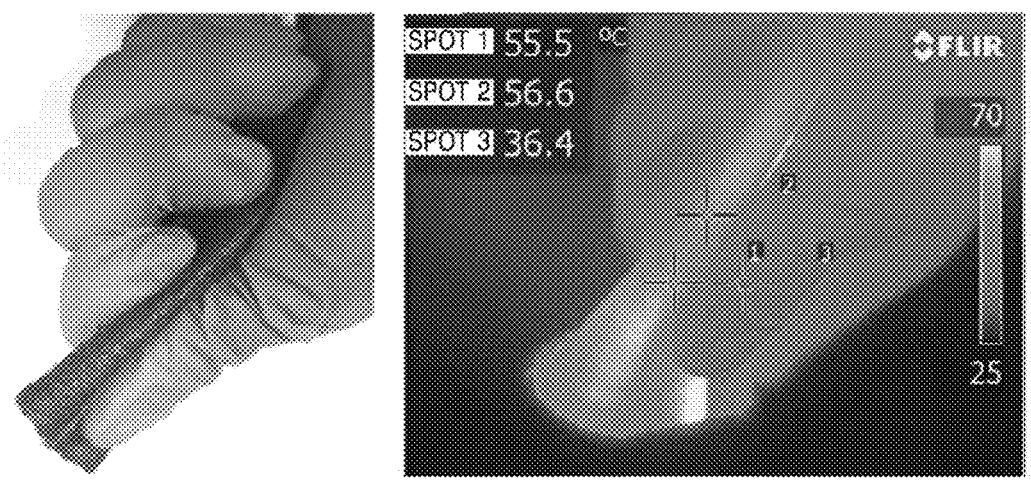
FIG. 11 illustrates images showing the heating characteristics of a metal nanowire heater fabricated using a fabric substrate including a polydimethylsiloxane (PDMS) overcoating layer.

FIG. 11 illustrates images showing the heating characteristics of a metal nanowire heater fabricated using a fabric substrate including a PDMS overcoating layer. That is, FIG. 11 illustrates images showing the heating characteristics of a heater fabricated by coating metal nanowires on fabric and coating PDMS as an overcoating layer, when the heater is completely folded.

By coating an overcoating layer having a high transmittance, durability, and heat resistance, on a heating element, adhesive strength to a substrate may be greatly increased. Furthermore, very stable heating characteristics may be achieved due to the high heat resistance of the overcoating layer.

According to the present invention, by supplying an ionic liquid to a flexible heater, which includes a metal nanowire heater, and applying heat from outside, thermal joining of nanowires may be strongly induced due to a chemical and physical action occurring when the ionic liquid is phase-changed. As such, a flexible heater having high heating characteristics at a low voltage may be fabricated by effectively reducing resistance of the heater. The above-described thermal joining process does not have restrictions in substrate shapes and types, is environment-friendly, requires a very low process cost, is usable as a roll-to-roll process, and thus has a very high possibility of commercialization. In addition, energy may be saved because higher heating characteristics may be achieved at the same voltage, and higher flexibility may be achieved because networking characteristics of the heater may be enhanced due to thermal joining of the nanowires.

A desired shape and design of a heater may be obtained based on a purpose of use by using a laser patterning process having a high process speed and capable of easily generating a complicated pattern in a large area, among various patterning processes capable of patterning a heater. In particular, metal nanowires may easily absorb optical energy of a laser and thus achieve an excellent patterning effect by using low optical energy.

By coating, on a heater, an overcoating layer having a high transmittance, durability, and heat resistance, adhesive strength to a substrate may be greatly increased. Furthermore, very stable heating characteristics may be achieved due to the high heat resistance of the overcoating layer. In particular, a liquid silica coating material having an excellent transmittance may be used to fabricate a transparent heater having a high durability without reducing transmittance of the transparent heater. In addition, since metal nanowires may be coated on various substrates such as a flexible film, fabric, paper, mulberry paper, and non-woven fabric without restrictions in substrate shapes and types, wearable devices may be very easily produced and future possibility of commercialization may be very high.

However, the above-described effects are merely examples and the scope of the present invention is not limited thereto.

While the present invention has been particularly shown and described with reference to embodiments thereof, it will be understood by one of ordinary skill in the art that various changes in form and details may be made therein without departing from the spirit and scope of the invention as defined by the following claims.

The embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of fabricating a metal nanowire heater, comprising:
   providing a substrate;
   coating on the substrate a nanowire film containing metal nanowires that are laser-etchable;
   thermally joining portions of the metal nanowires to enhance connection between contact parts of the metal nanowires and provide an enhanced nanowire film by at least one unit cycle of supplying an ionic liquid onto the nanowire film and applying heat from outside to cause the ionic liquid to change its phase; and
   forming electrodes on the enhanced nanowire film to provide the metal nanowire heater.

2. The method of claim 1, wherein the metal nanowires comprise a metal selected from the group consisting of copper, aluminum, gold, silver, palladium, platinum, nickel, rhodium, ruthenium, tungsten, zinc, and alloy combinations thereof.

3. The method of claim 1, wherein the substrate comprises a flexible film comprising polyethylene terephthalate (PET), polycarbonate (PC), cyclic polyolefin (COP), modified polyphenylene oxide (modified PPO), polyacrylonitrile (PAN), polyacetal (POM), triacetate cellulose (TAC), polyethersulfone (PES), liquid crystal polymer (LCP), polyphenylene sulfide (PPS), polyestersulfone (PES), polyarylate (PAR), polyetheretherketone (PEEK), polyetherimide (PEI), polyimide (PI), fabric, paper, mulberry paper, or non-woven fabric.

4. The method of claim 1, wherein the substrate comprises a hard plastic or a glass.

5. The method of claim 1, wherein the at least one cycle of supplying the ionic liquid onto the nanowire film; and applying heat from outside to cause the ionic liquid to change its phase, is repeated up to four times prior to forming the electrodes on the enhanced nanowire film.

6. The method of claim 5, wherein the metal nanowire heater has a sheet resistance value that is lower than that of a metal nanowire heater fabricated without performing the at least one unit cycle, and that is gradually reduced as the at least one unit cycle is gradually increased from one to four times.

7. The method of claim 1, wherein the ionic liquid comprises distilled water.

8. The method of claim 1, wherein coating comprises brush coating, wire bar coating, slot die coating, spray coating, or spin coating.

9. The method of claim 1, further comprising patterning the nanowire film using a short-wavelength laser.

10. The method of claim 1, further comprising forming on the nanowire film an overcoating layer containing polymethylmethacrylate (PMMA), polyurethane, polymethylmethacrylate (PMMA), polyacrylonitrile (PAN), polyacrylic acid (PAA), polydimethylsiloxane (PDMS), polyphenylene sulfide (PPS), polyether sulfone (PES), COP (cyclic polyolefin), modified polyphenylene oxide (modified PPO), polyphenylene sulfide (PPS), polyarylate (PAR), polyetheretherketone (PEEK), polyetherimide (PEI), polyimide (PI), an organic-inorganic hybrid silicon coating material, or a liquid silica coating material.

11. The method of claim 1, wherein the ionic liquid contains aluminum chloride ($AlCl_3.6H_2O$), aluminum sulfate ($Al_2(SO_4)O_3$), aluminum nitrate ($Al(NO_3)_3.9H_2O$), and ammonium chlorate ($NH_4ClO_3$).

12. A metal nanowire heater fabricated using the method of claim 1.

13. The metal nanowire heater of claim 12, wherein the metal nanowire heater has a sheet resistance value that is less than 40Ω/□ while ensuring a transmittance equal to or higher than 90% at a wavelength of 550 nm.

14. The metal nanowire heater of claim 13, wherein the metal nanowire heater has a sheet resistance value that is 15Ω/□ at a transmittance of 90.6% at the wavelength of 550 nm.

* * * * *